United States Patent [19]

Kamath et al.

[11] Patent Number: 4,804,775

[45] Date of Patent: Feb. 14, 1989

[54] PROCESS FOR REDUCING RESIDUAL MONOMERS IN LOW VISCOSITY POLYMER-POLYOLS

[75] Inventors: Vasanth R. Kamath; Leonard H. Palys, both of Erie, N.Y.

[73] Assignee: Pennwalt Corporation, Philadelphia, Pa.

[21] Appl. No.: 905,412

[22] Filed: Sep. 9, 1986

[51] Int. Cl.$^4$ ............................................. C07C 121/54
[52] U.S. Cl. ....................................... 558/358; 526/86; 558/388
[58] Field of Search ................... 558/358, 388; 526/86

[56] References Cited

U.S. PATENT DOCUMENTS 4,172,825 10/1979 Shook et al. ........................... 528/75

Primary Examiner—Anton H. Sutto

[57] ABSTRACT

An improved process is provided for preparing stable low viscosity polymer-polyols containing less than about 100 ppm residual monomers by using a monoperoxycarbonate initiator in combination with at least one initiator selected from diperoxyketals and peroxyesters, as chaser catalysts, at or near the end of the polymerization. The polymer-polyols prepared by the instant invention can be used to prepare high resiliency (load bearing) polyurethane foams.

16 Claims, No Drawings

PROCESS FOR REDUCING RESIDUAL MONOMERS IN LOW VISCOSITY POLYMER-POLYOLS

BACKGROUND OF THE INVENTION

Prior to the present invention polymer-polyol compositions were prepared by polymerizing one or more olefinically unsaturated monomers dissolved or dispersed in a polyol using free radical azo or peroxide initiators. In order to produce low-viscosity polymer-polyols containing low residual monomer levels, a vacuum stripping step was necessary which was often the most time consuming part of the entire manufacturing polymer-polyol manufacturing process. Thus, the vacuum stripping operation increased the total production time, increased the risk of personnel health problems by having to vacuum strip toxic monomers, and decreased productivity. Representative prior art methods for preparing polymer-polyols are disclosed in U.S. Pat. Nos. 4,172,825, 4,242,249, and 4,431,754.

The process of the present invention eliminates the lengthy and expensive vacuum stripping step of the prior art.

SUMMARY OF THE INVENTION

The present invention is directed to an improved process of preparing low-viscosity polymer-polyols by:
(a) polymerizing a reaction mixture of 40 to 90 parts of polyol, 10 to 60 parts of at least one ethylenically unsaturated monomer, and 0.01 to 10 parts of a free radical initiator,
(b) after the reaction has been 80–95% completed, adding a chaser catalyst of a combination of 0.01 to 5.0 parts of a monoperoxycarbonate and 0.01 to 5.0 parts of at least one peroxide selected from a diperoxyketal or a peroxyester, and
(c) reacting this new reaction mass at a predetermined temperature for an additional time period, wherein the final product has a low-viscosity and good color and the residual monomer concentration is less than about 100 ppm.

DETAILED DESCRIPTION OF THE INVENTION

It has been discovered that certain specific chaser catalyst combinations are surprisingly efficient in reducing residual monomer concentration in polymer-polyols. Moreover, this is accomplished while maintaining the desired low viscosity and good color. By using the process of the present invention, total residual monomer concentration is less than about 100 ppm and thus expensive and time consuming vacuum stripping operation, (of prior art methods) are eliminated.

Polyols useful in the instant invention include polyethers, polyester, polyamides, etc. The most preferred polyols are the polyalkylene oxide polyether polyols, prepared from alkylene oxides having from two to six carbons. For example, the polyols can comprise poly(oxypropylene) and/or poly(oxypropylene-oxyethylene)glycols, triols, and higher functionality polyols. The number average molecular weight of the polyols can be about 400 or greater, preferably about 1000 or greater. It is well known in the art that polyols can contain varying amounts of unsaturation. The extent or type of unsaturation present on the polyol should not affect this invention.

The polyols are made by reacting alkylene oxides (like ethylene oxide and/or propylene oxide) with polyhydroxyalkanes (e.g., glycerol) or with other compounds known in the art, for example, phosphorus, polyphosphorus acid, non-reducing sugars, castor oil, etc. The various methods for preparing such polyols can be found in the art, for example, U.S. Pat. No. 4,431,754, U.S. Pat. No. 4,172,825, and U.S. Pat. No. 4,522,976; such methods are incorporated herein by reference.

Suitable olefinic or ethylenically unsaturated monomers used in the present invention include (i) various substituted or unsubstituted vinyl aromatic monomers such as styrene or para-methyl styrene (ii) esters of acrylic/methacrylic acids, and (iii) ethylenically unsaturated nitriles and amides such as acrylonitrile, methacrylonitrile, or acrylamide.

The preferred monomers are styrene and/or acrylonitrile; when these monomers are employed, they produce a SAN (styrene-acrylonitrile) copolymer. The amount of styrene (with respect to acrylonitrile) can vary from about 10% to about 85%, preferably between 20% to about 80%, more preferably between 40% and 75%, most preferably between 50% to about 70%.

The amount of copolymer used to make the polymer-polyol will depend upon the desired stiffness of the resulting urethane foam as well as viscosity and stability constraints. Generally, the copolymer content can vary from about 10% to about 60% based on the weight of the polymer-polyol, preferably 15% to 40%, more preferably 20% to 40%. The properties of the final polymer-polyols will be influenced by the concentration of the added polymer (or copolymer). In general, the viscosity will increase with increasing polymer content in the polyol. Generally, preferred polymer-polyols for high resiliency polyurethane foams would contain approximately 20–25% of polymer and have a viscosity of about 3000 to about 6000 centipose at ambient temperatures. Polymer-polyols with polymer levels in excess of 40% can be made, but the resulting modified polyol may have undesirably high viscosities, depending upon the process used.

Generally, the monomers as well as the initiators which are predispersed in some polyol, are metered into a reactor system containing more stirred polyol heated to the reaction temperature under a nitrogen blanket.

The polymerization can be conducted in bulk or solution at a temperature range of from about 25° to about 180° C., preferably between 60° and 150° C., more preferably between 70° and 140°.

This polymerization is conducted using azo or peroxide initiators. The initiator concentration range is from about 0.01 to 10 phm, preferably between 0.1 to 5 phm, more preferably between 0.5 to 3.5 phm, most preferably between 0.5 and 1.5 phm. ("phm" means parts by weight of initiator for every one hundred parts by weight of total monomer(s) used.) Commonly used initiators include the following: 2,2'-Azo-bis(methylbutyronitrile), Azo-bis(isobutyronitrile), 2,2'(2,4-dimethylvaleronitrile), t-butyl peroctoate, t-amyl peroctoate, and t-amylperoxypivalate.

The initiator selection is influenced by reaction temperature, desired half-life, safety considerations, etc.

CHASER CATALYST

The monoperoxycarbonate chaser catalysts of the instant invention can be represented by the following general structure:

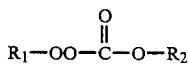

wherein $R_1$ is selected from tert-alkyl of 4 to 12 carbons, tert-cycloalkyl of 6 to 12 carbons, where said alkyl and cycloalkyl groups may be substituted by halogen, lower alkoxy of 1–4 carbons, or hydroxy. $R_2$ is selected from alkyl of 1 to 18 carbons, cycloalkyl of 3 to 12 carbons, where said alkyl and cycloalkyl groups may be substituted by halogen, lower alkoxy of 1–4 carbons, or aryl of 6–14 carbons and said aryl group may be substituted by halogen, lower alkoxy of 1–4 carbons, or lower alkyl.

The ten hour half life temperature of these monoperoxycarbonates in dilute solution (e.g., 0.05 to 0.2 molar in dodecane) is generally in the range of 95 to 105 degrees. The preferred monoperoxycarbonates are those derived from t-alkyl hydroperoxides containing 5 or more carbons. A representative list of suitable monoperoxycarbonates is OO-t-amyl-O-(2-ethylhexyl)-monoperoxycarbonate, OO-t-amyl-O-isopropyl-monoperoxycarbonate, and OO-t-octyl-O-(2-ethylhexyl)monoperoxycarbonate.

The diperoxyketals of the instant invention can be represented by the following general structure:

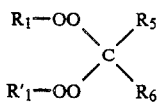

wherein $R_1$ and $R'_1$ are the same or different and the definition is the same as for $R_1$ definition for monoperoxycarbonates; $R_5$ is selected from lower alkyl of 1 to 4 carbons and lower cycloalkyl of 3 to 6 carbons; and $R_6$ is selected from alkyl of 1 to 10 carbons and cycloalkyl of 3 to 12 carbons where said alkyl and cycloalkyl may be substituted by halogen, lower alkoxy of 1–4 carbons, lower alkoxycarbonyl of 1–5 carbons, lower acyloxy of 1–5 carbons, or aryl of 6 to 14 carbons; said aryl group may be substituted by halogen, lower alkoxy or lower alkyl.

The ten hour half life temperatures of these peroxyketals in dilute solution (e.g., 0.05 to 0.2 molar in dodecane) is generally in the range of 90° to 115° C. A representative list of suitable peroxyketals include 2,2-bis(t-amylperoxy)butane, n-butyl-4,4-bis(t-amylperoxy)valerate, and ethyl 3,3-di(t-amylperoxy)butyrate.

The preferred peroxyketals are those derived from t-alkyl hydroperoxides containing 5 or more carbons.

The peroxyester chaser catalysts of the instant invention can be represented by the following general structure:

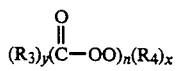

wherein:
(a) x, y, and n are 1 or 2;
(b) when x is 2, y is 1, and n is 2;
(c) when y is 2, x is 1, and n is 2;
(d) when x, y, and n are 1, $R_3$ is selected from the group consisting of a primary or secondary alkyl of 1 to 17 carbons, aryl of 6 to 14 carbons, and cycloalkyl of 3 to 12 carbons, said alkyl and cycloalkyl groups may be substituted by halogen, lower alkoxy, or aryl, said aryl group may be substituted by halogen, lower alkoxy, or lower alkyl of 1 to 4 carbons, and $R_4$ is selected from the group consisting of tertiary alkyl of 4 to 12 carbons, tertiary cycloalkyl of 6 to 12 carbons, wherein said alkyl and cycloalkyl groups may be substituted by halogen, lower alkoxy, or hydroxy;
(e) when x is 2, $R_3$ is a diradical selected from the group consisting of alkylene of 1 to 10 carbons, arylene of 6 to 14 carbons, and cycloalkylene of 3 to 12 carbons, and $R_4$ is the same as defined in (d); and
(f) when y is 2, $R_4$ is a di-tertiary diradical selected from alkylene of 6 to 16 carbons, alkynylene of 6 to 16 carbons, and cycloalkylene of 7 to 12 carbons, and $R_3$ is the same as defined in (d).

The ten hour half life of these peroxyesters in dilute solution (e.g., 0.05 to 0.2 molar dodecane) is generally in the range of 75° to 105° C. The preferred peroxyesters like the monoperoxycarbonates and the peroxyketals are those derived from t-alkyl hydroperoxides containing 5 or more carbons. Representative peroxyesters are t-amyl perbenzoate, t-amyl peroxyisononanoate, t-amyl peroxymaleic acid, and t-amyl peroxyacetate.

The blend ratio of monoperoxycarbonates with the other preferred chaser catalysts can be from about 5% to about 95% by weight of the chaser catalyst mixture, preferably from about 10% to 90%, more preferably from about 20% to 80%.

The overall concentration range for the chaser catalyst blend is generally from about 0.1 to about 5.0 phm. The preferred range is 0.1 to about 3.0 phm, most preferably between 0.5 and 1.5 phm. The blend ratio range of the various chaser catalyst components in respect to diperoxyketal or peroxyester to monoperoxycarbonate is 1:1 to 1:3.

As a rule, the chaser catalysts of the instant invention would be added after reaching about 80% conversion, preferably after 90% conversion, and most preferably after 95% conversion. The chaser catalysts may be added in one shot or can be metered in over a period of time, either as is or diluted down in polyol or solvent as desired, keeping in mind ease of handling or safety considerations. Although this is the desired mode of adding chaser catalysts, depending upon the specific polymerization conditions employed, the chaser catalyst can conceivably also be added at the beginning of the polymerization (when it has a higher activation temperature than the initial reaction) and would be expected to function in the same manner. In the event the chaser catalysts are introduced at the beginning of the reaction, it may be necessary to increase the chaser catalyst concentration so as to obtain the desired reduction in residual monomer concentration.

The chaser catalysts of the instant invention are generally used in a temperature range of about 80° C. to 180° C., preferably between 80° C. and 150° C., and more preferably between 90° C. and 140° C. The temperature at which the chaser catalysts are employed could be the same or different than the initial reaction temperature. However, in commercial practice, it may be more desirable to use the same reaction temperature throughout. The polymerization reaction is then continued from 1 to 10 hours, preferably from 2 to 8 hours, most preferably from 2 to 6 hours. The function of the chaser catalysts is to continue the polymerization and drive the reaction to completion, i.e., to reduce the residual monomer concentration to less than 500 ppm, preferably less than 250 ppm, most preferably less than 100 ppm.

The polymer-polyol reaction along with the chaser catalyst addition step may be run by batch or continuous process.

EXAMPLES

The following examples are presented for purposes of illustrating the invention and are not to be considered a limitation of the invention.

MATERIALS USED IN THE EXAMPLES

Polyol I—Voranol ® 4702 marketed by Dow Chemical, is a polyether polyol (triol type) with a hydroxyl number of about 34. It has a number average molecular weight of about 7,808 as determined by gel permeation chromatography calibrated using polystyrene standards, or a molecular weight of about 5,000 based on hydroxyl numbers. It is a polypropylene oxide polymer, glycerin based, and endcapped with ethylene oxide.

Polyol II—Niax ® LG-56 marketed by Union Carbide Corporation. It is a polyether polyol (triol type) with a hydroxyl number of about 56. It is a polypropylene oxide-based polyol containing only secondary hydroxyl groups (i.e., no ethylene oxide content). It has a molecular weight of about 3000 as calculated from hydroxyl number.

Lupersol ® TAEC—OO-t-amylperoxy O-2-ethylhexyl monoperoxycarbonate marketed by the Lucidol Division of Pennwalt Corporation.

Lupersol ® TAIC—OO-T-amylperoxy O-isopropyl monoperoxycarbonate, marketed by the Lucidol Division of Pennwalt Corporation.

Lupersol ® 533—Ethyl-3,3-di(t-amylperoxy)butyrate, marketed by the Lucidol Division of Pennwalt Corporation.

Luperox ® 204—Di-(2-phenoxyethyl)peroxydicarbonate, marketed by the Lucidol Division of Pennwalt Corporation.

Lupersol ® 554—T-amyl peroxypivalate, marketed by the Lucidol Division of Pennwalt Corporation.

Lupersol ® 575—T-amylperoxy-2-ethylhexanoate, marketed by the Lucidol Division of Pennwalt Corporation.

Lupersol ® 570—T-amyl peroxyisononanoate, marketed by the Lucidol Division of Pennwalt Corporation.

Lupersol ® TAPB—T-amyl peroxybenzoate, marketed by the Lucidol Division of Pennwalt Corporation.

STANDARD EXPERIMENTAL PROCEDURE

A bottom discharge glass jacketed reactor (1.5 liter) equipped with stirrer, condenser, thermometer, and a heating oil circulator bath was used to conduct all the polymerizations. The heating oil circulator bath used was a Haake Model F2, capable of controlling the reaction temperature within a half degree celsius. A blanket of nitrogen was maintained throughout the entire reaction.

In all cases, a portion of a polyol was added to the reactor and heated under nitrogen to the reaction temperature. Then a solution of more polyol and select monomers and initiator was metered into the stirred reactor at a predetermined rate using a precision metering pump.

Metering the Monomer/Polyol/Initiator Solution:

The metering pump used was made by FMI, Model #G-20 equipped with a stainless steel metering head, and fitted with a ceramic sleeve and 0.25 inch diameter ceramic piston.

After a predetermined reaction time, instead of conducting a vacuum stripping operation, a certain quantity of chaser catalysts are added using a disposable pipet. The reaction temperature at which the chaser catalysts are employed could be the same or different than the initial temperature. The time-temperature profile of this subsequent reaction should be sufficient to decompose the chasers in a reasonable time. Most preferably, the chaser catalysts are used at reaction temperatures between 90° and 140° C. After chaser addition, the polymerization is then continued for a predetermined time period of from 1 to 10 hours.

As required, samples were withdrawn from the top using a pipet, and submitted for analysis by G.C. (gas chromatography).

At the end of the polymerizations, the product was discharged into a glass bottle and allowed to cool to room temperature.

Polymer-polyol viscosity measurement was determined using a Brookfield Viscometer Model #HBT with a #HB3 Spindle at a speed setting of 50 rpm, at room temperature.

Residual monomer concentration in the polymer-polyols was determined using gas chromatography (G.C.). The samples were diluted down to 10% solution using dimethyl formamide and injected into a Hewlett Packard Gas Chromatograph Model 5840A, equipped with a 6 ft. Carbowax 20M 800 mesh column using an isothermal profile. The residual monomer levels were determined from the automatic integrator which compares the values obtained to those from previously injected monomer standards.

EXAMPLE I

Polymer-polyol was prepared as per experimental procedure described earlier. The reactant charges consisted of:

Polyol I: 321 g.
Styrene: 60 g.
Acrylonitrile: 60 g.
Polyol I: 159 g.

321 grams of Polyol I was charged into a jacketed glass reactor and heated under nitrogen to the reaction temperature of 120° C. Then a solution of styrene monomer inhibited with 10 ppm of p-t-butyl catechol ("STY") (60 g.), acrylonitrile monomer inhibited with 10 ppm MEHQ ("ACN") (60 g.), polyol I (159 g.) and 2.5 phm of Lupersol ® 575 was metered into the reactor at a uniform rate of 2.35 g./minute over a period of 2 hours, using a metering pump. After which the reaction is continued for an additional 80 minutes, giving a total reaction time of 200 minutes.

The temperature was then quickly raised to 130° C. and the desired weight amount of chaser catalysts was added to the reactor using disposable pipetes. The reaction was then continued for an additional 3 hours. Samples were taken for residual monomer analysis by G.C., as required.

At the end of the reaction, the polymer-polyol was bottom discharged into a glass bottle, capped, and allowed to cool to room temperature. The color of the modified polyol was visually determined through the clear glass bottle and was graded as follows:
good=white to off white medium=light beige
dark=medium beige, tan color

TABLE 1

| chaser catalyst | chaser phm | residual monomer (ppm) ACN | STY | Brookfield viscosity (cps) | color |
|---|---|---|---|---|---|
| none | — | 6000 | 3000 | 4500 | good |
| Lupersol 533 | 1.0 | <30 | <30 | 9300 | good |
| Lupersol TAEC | 1.5 | 100 | 100 | 3800 | medium |
| Lupersol 533 & Lupersol TAEC | 0.5/0.5 | <30 | <30 | 3400 | good |

Using Lupersol 533 alone, low residual monomer levels were achieved; however, the viscosity increased dramatically thus producing an unsatisfactory polymer-polyol as compared to the starting polyol with no chaser.

Using Lupersol® TAEC alone, acceptable viscosity was achieved; however, the residual monomer levels were too high.

Using a chaser catalyst combination of Lupersol® TAEC (a monoperoxycarbonate) and Lupersol® 533 (a peroxyketal), both a low residual monomer level as well as a satisfactory Brookfield viscosity were achieved.

Thus, the chaser catalyst of the instant invention produced a synergistic effect in terms of reducing the viscosity of the polymer polyol while simultaneously reducing total residual monomer concentration to less than 100 ppm.

EXAMPLE 2

This example illustrates the performance of monoperoxycarbonate-peroxyester blends as compared to the use of these as singular finishing catalysts. Based on the data below in Table 2, the blends produced low viscosity polymer-polyols with a total combined residual monomer level of about 100 ppm.

TABLE 2

| chaser catalyst | chaser phm | residual monomer (ppm) ACN | STY | Brookfield viscosity (cps) | color |
|---|---|---|---|---|---|
| none | — | 6000 | 3000 | 4500 | good |
| Lupersol 570 | 1.0 | 815 | 220 | 3300 | good |
| Lupersol TAEC | 1.5 | 100 | 100 | 3800 | good |
| Lupersol TAEC & Lupersol 570 | 0.5/0.5 | 20 | 40 | 3600 | good |
| Lupersol 575 | 1.0 | 1100 | 520 | 4200 | good |
| Lupersol 575 & Lupersol TAEC | 0.5/0.5 | <25 | 105 | 3400 | good |

EXAMPLE 3

In this example chaser catalyst mixtures at different blend ratios were illustrated.

TABLE 3

| chaser catalyst | chaser phm | residual monomer (ppm) ACN | STY | Brookfield viscosity (cps) | color |
|---|---|---|---|---|---|
| Lupersol 533 & Lupersol TAEC | 0.5/0.5 | <30 | <30 | 3400 | good |
| Lupersol 533 & Lupersol TAEC | 0.3/0.7 | <25 | <25 | 3700 | good |

This example demonstrates that although the percent of Lupersol® TAEC used in the mixture was increased from 50 to 70%, (i.e., decreasing the Lupersol 533 use level from 50 to 30% in the blend), significantly reduced residual monomer levels were still obtained, while maintaining acceptable polyol viscosities.

EXAMPLE 4

In this example a different monoperoxycarbonate with a peroxyketal as chaser catalyst was used to prepare polymer-polyols with low viscosities and low residual monomer levels.

TABLE 4

| chaser catalyst | chaser phm | residual monomer (ppm) ACN | STY | Brookfield viscosity (cps) | color |
|---|---|---|---|---|---|
| Lupersol 533 & Lupersol TAEC | 0.5/0.5 | <30 | <30 | 3400 | good |
| Lupersol 533 & Lupersol TAIC | 0.5/0.5 | 50 | <25 | 4200 | good |

EXAMPLE 5

This example illustrates the importance of the novel chaser catalyst mixtures when increasing the percentage of poly(styrene/acrylonitrile) ("SAN") copolymer content in the polymer-polyol.

(i) Preparation of the polymer-polyol (containing 20% SAN)
Same as EXAMPLE 1.
(ii) Preparation of the polymer-polyol (containing 25% SAN)
Same as Example 1, except the charges were as follows:
Polyol I: 321 g.
Styrene: 80 g.
Acrylonitrile: 80 g.
Polyol I: 159 g.

321 grams of polyol I was added to the glass jacketed reactor and heated to the reaction temperature of 120° C. A solution consisting of (a) 80 g. STY, (b) 80 g. ACN, (c) 159 g. polyol I, and (d) 2.5 phm Lupersol® 575 was metered at a uniform rate of 2.35 g. per minute to the stirred polyol for 135 minutes. After the monomer/polyol/initiator addition was completed, the polymerization was continued so that the total reaction time was still 200 minutes, as before in Example 1.

TABLE 5

| % SAN | Chaser Catalyst | chaser phm | residual monomer (ppm) ACN | STY | Brookfield viscosity (cps) |
|---|---|---|---|---|---|
| 20 | Lupersol 533 | 1.0 | <30 | <30 | 9300 |
| 20 | Lupersol 533 & Lupersol TAEC | 0.5/0.5 | <30 | <30 | 3400 |
| 25 | Lupersol 533 | 1.0 | <50 | <50 | 12000 |
| 25 | Lupersol 533 & Lupersol TAEC | 0.5/0.5 | <50 | <50 | 5700 |

Increasing the SAN (styrene-acrylonitrile copolymer) content in the modified polyol is desirable because a polyurethane foam made from a polymer polyol with higher SAN content will result in a foam with greater stiffness/higher compressive modulus. When preparing such modified polyols, the properties of low residual monomer and low brookfield viscosity are still desirable. Thus, under these conditions, the proper selection of chaser catalysts becomes even more important, as demonstrated by the results in Table 5.

From the above data it is clear that the combination of Lupersol 533 with Lupersol TAEC provides a much more desirable polymer polyol by providing a low viscosity as well as desirable low residual monomer levels, as compared to the Lupersol 533 peroxyketal catalyst used alone.

EXAMPLE 6

This example illustrates the utility of chaser blends in lower molecular weight polymer-polyols which normally possess a higher hydroxyl functionality.
(i) Preparation of the polymer-polyol
Same as described in Example 1 except the charges are
Charges:
Polyol II: 321 g.
Styrene: 60 g.
Acrylonitrile: 60 g.
Polyol II: 159 g.

321 grams of polyol II was added to the glass jacketed reactor and heated to the reaction temperature of 100° C. or 110° C. for Luperox 204 and Lupersol 554, respectfully. A solution consisting of (a) 60 g. of STY, (b) 60 g. of ACN, (c) 159 g. of polyol II, and (d) 2.5 phm of Luperox 204 or 2.5 phm of Lupersol 554 (as indicated) was added uniformly at a rate of 4.70 grams per minute to the stirred polyol for 1 hour. After the monomer/polyol/initiator addition was completed, the reaction was continued for a total reaction time of 200 minutes. After which the temperature was quickly raised to 130° C., chaser catalysts were added, and the polymerization was continued for an additional three hours.

TABLE 6

| first stage initiator | chaser catalyst | chaser phm | residual monomer (ppm) ACN | residual monomer (ppm) STY | Brookfield viscosity (cps) | color |
|---|---|---|---|---|---|---|
| Luperox 204 | Lupersol 533 | 1.0 | 400 | 500 | 6200 | good |
| Luperox 204 | Lupersol 533 & Lupersol TAEC | 0.5/0.5 | 40 | <25 | 4100 | good |
| Lupersol 554 | Lupersol 533 | 1.0 | <50 | <50 | 5800 | good |
| Lupersol 554 | Lupersol 533 & Lupersol TAEC | 0.5/0.5 | <50 | <25 | 3500 | good |

Based upon the above results, significant improvements in the final polymer-polyol viscosity were observed when using the mixture of chaser catalysts of this invention.

What is claimed:

1. An improved process of preparing a low-viscosity polymer-polyol by
   (a) polymerizing a reaction mixture of 40 to 90 parts of a polyol, 10 to 60 parts of at least one ethylenically unsaturated monomer, and 0.01 to 10 parts of a free radical initiator,
   (b) after the reaction has been 80-95% completed, adding a chaser catalyst of a combination of 0.01 to 5.0 parts of a monoperoxycarbonate and 0.01 to 5.0 parts of at least one peroxide selected from a diperoxyketal or a peroxyester, and
   (c) heating the reaction mass between about 80° C. and about 180° C. for an additional time period of at least one hour to drive the polymerization reaction to completion.

2. The process of claim 1 wherein the polyol is selected from polyethers, polyesters, and polyamides.

3. The process of claim 2 wherein the polyol is a polyalkylene oxide polyether polyol prepared from an alkylene oxide having 2 to 6 carbons.

4. The process of claim 2 wherein the at least one ethylenically unsaturated monomer is selected from substituted or unsubstituted vinyl aromatic monomers, esters of acrylic or methacrylic acids, and ethylenically unsaturated nitriles and amides.

5. The process of claim 4 wherein the monomers are styrene and acrylonitrile.

6. The process of claim 4 wherein the free radical initiator is an azo or a peroxide.

7. The process of claim 6 wherein the monoperoxycarbonate component of the chaser catalyst is selected from

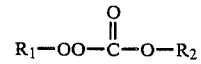

wherein $R_1$ is selected from substituted or unsubstituted tert-alkyl of 4–8 carbons and substituted or unsubstituted tert-cycloalkyl of 6 to 12 carbons where the substituent is selected from halogen, alkoxy of 1–4 carbons and hydroxy, $R_2$ is selected from substituted or unsubstituted alkyl of 3–8 carbons, substituted or unsubstituted cycloalkyl of 3 to 12 carbons, and substituted or unsubstituted aryl of 6–14 carbons where the substituents are selected from halogen and alkoxy of 1–4 carbons.

8. The process of claim 7 wherein the monoperoxycarbonate component is selected from OO-t-amyl-O-(2-ethylhexyl)monoperoxycarbonate, OO-t-butyl-O-(2-ethylhexyl)monoperoxycarbonate, OO-t-octyl-O-(2-ethylhexyl)monoperoxycarbonate, OO-t-amyl-O-isopropylmonoperoxycarbonate, OO-t-butyl-O-isopropylmonoperoxycarbonate, and OO-t-octyl-O-isopropylmonoperoxycarbonate.

9. The process of claim 7, wherein the diperoxyketal component of the chaser catalyst is selected from

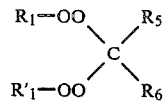

wherein $R_1$ and $R'_1$ are the same or different and the definition is the same as for $R_1$ definition for monoperoxycarbonates, $R_5$ is methyl and $R_6$ is selected from alkyl of 1 to 2 carbons and cycloalkyl of 3 to 12 carbons where said alkyl and cycloalkyl may be substituted by halogen, lower alkoxy of 2–4 carbons, lower alkoxycarbonyl of 2–4 carbons, lower acyloxy of 1–5 carbons, or aryl of 6 to 14 carbons, said aryl group may be substituted by halogen, lower alkoxy or lower alkyl.

10. The process of claim 9 wherein the diperoxyketal component of the chaser catalyst is selected from 2,2-bis(t-amylperoxy)butane, n-butyl-4,4-bis(t-amylperoxy)valerate, ethyl 3,3-di(t-amylperoxy)butyrate, 2,2-di(t-amylperoxy)propane, 2,2-bis(t-butylperoxy)butane, n-butyl-4,4-bis(t-butylperoxy)valerate, ethyl 3,3-di(t- butylperoxy)butyrate, and 2,2-di(t-butylperoxy)propane.

11. The process of claim 7 wherein the peroxyester component of the chaser catalyst is selected from

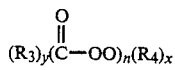

wherein:
(a) x, y, and n are 1 or 2,
(b) when x is 2, y is 1, and n is 2,
(c) when y is 2, x is 1, and n is 2,
(d) when x, y, and n are 1, $R_3$ is selected from the group consisting of an alkyl of 1 to 10 carbons, aryl of 6 to 12 carbons, and cycloalkyl of 3 to 12 carbons, said alkyl and cycloalkyl groups may be substituted by halogen, lower alkoxy, or aryl, said aryl group may be substituted by halogen, lower alkoxy, or lower alkyl of 1 to 4 carbons, and $R_4$ is selected from the group consisting of tertiary alkyl of 4 to 8 carbons, tertiary cycloalkyl of 6 to 12 carbons, wherein said alkyl and cylcloalkyl groups may be substituted by halogen, lower alkoxy, or hydroxy,
(e) when x is 2, $R_3$ is a diradical selected from the group consisting of alkylene of 1 to 10 carbons, arylene of 6 to 14 carbons, and cycloalkylene of 3 to 12 carbons, and $R_4$ is the same as defined in (d), and
(f) when y is 2, $R_4$ is a di-tertiary diradical selected from alkylene of 7 to 10 carbons, alkynylene of 7 to 10 carbons, and cycloalkylene of 7 to 12 carbons, and $R_3$ is the same as defined in (d).

12. The process of claim 11, wherein the peroxyester component of the chaser combination is selected from t-amyl peroxyneodecanoate, t-amyl peroxypivalate, 2,5-dimehtyl-2,5-(2-ethylhexanoylperoxy)hexane, t-amyl peroctoate, t-amyl perbenzoate, 2,5-dimethyl-2,5-bis(benzoylperoxy)hexane, t-amyl peroxyisononanoate, t-amyl peroxyacetate, t-amyl peroxymaleic acid, t-butyl peroxyneodecanoate, t-butyl peroxypivalate, t-butyl peroctoate, t-butyl perbenzoate, t-butyl peroxyisononanoate, t-butyl peroxyacetate, and t-butyl peroxymaleic acid.

13. The process of claim 1 wherein the chaser catalyst is selected from (i) OO-t-amylperoxy O-2-ethylhexyl monoperoxycarbonate and one of t-amyl peroxyisonanoate, t-amylperoxy-2-ethylhexanoate, or ethyl-3,3-di(t-amylperoxy)butyrate and (ii) OO-t-amylperoxy O-isopropyl monoperoxycarbonate and ethyl-3,3-di(t-amylperoxy)butyrate.

14. The process of claim 13 wherein the blend ratio range of diperoxyketal or peroxyester to monoperoxycarbonate is 1:1 to 1:3.

15. A process of preparing a low-viscosity polymer-polyol by
(a) polymerizing a reaction mixture of 40 to 90 parts of polyol, 10–60 parts of at least one ethylenically unsaturated monomer, and 0.01 to 10 parts of a free radical initiator,
(b) after the reaction has been 80–90% completed, adding a chaser catalyst of a combination of 0.01 to 5.0 parts of a monoperoxycarbonate selected from OO-t-amyl-O-(2-ethylhexyl)monoperoxycarbonate and OO-t-amyl-O-isopropylmonoperoxycarbonate and 0.01 to 5.0 parts of ethyl-3,3-di(t-amylperoxy)-butyrate or t-amyl peroxyisonoate, and
(c) heating the reaction mass between about 80° C. and about 180° C. for an additional time period of at least one hour to drive the polymerization reaction to completion.

16. The process of claim 1 wherein the polyol is a polyether of a triol type with a hydroxyl number between about 34 and about 56, and the ethylenically unsaturated monomer is selected from styrene and acrylonitrile.

* * * * *